United States Patent [19]
Doumard

[11] Patent Number: 5,774,732
[45] Date of Patent: Jun. 30, 1998

[54] DEVICE FOR MANAGING CYCLIC POLLINGS FOR THE SUPERVISION OF COMPUTER RESOURCES IN A NETWORK AND A PROCESS IMPLEMENTED BY SUCH A DEVICE

[75] Inventor: Raphaël Doumard, Les Clayes sous Bois, France

[73] Assignee: Bull S.A., Louveciennes, France

[21] Appl. No.: 622,304

[22] Filed: Mar. 27, 1996

[30] Foreign Application Priority Data

Apr. 6, 1995 [FR] France .................................. 95 04093

[51] Int. Cl.$^6$ .................................................. G06F 13/00
[52] U.S. Cl. ................................................................ 395/727
[58] Field of Search .................................... 395/727, 289, 395/200.02, 200.06, 200.11, 200.19, 200.2, 200.53, 200.55

[56] References Cited

U.S. PATENT DOCUMENTS

| | | | |
|---|---|---|---|
| 4,638,428 | 1/1987 | Gemma et al. | 395/729 |
| 5,539,882 | 7/1996 | Gopal et al. | 395/200.1 |
| 5,586,056 | 12/1996 | Watanabe | 364/550 |

FOREIGN PATENT DOCUMENTS 9310495  5/1993  WIPO .

OTHER PUBLICATIONS

Communications for Distributed Applications and Systems, Chapel Hill, Apr. 18–19, 1991, Conf. 4, Apr. 18, 1991, IEEE, pp. 235–242, XP 000278452, J.D. Brock, "Tingle—A Single for Monitoring Networks".

*Primary Examiner*—Glenn A. Auve
*Attorney, Agent, or Firm*—Kerkam, Stowell, Kondracki & Clarke, P.C.; Edward J. Kondracki

[57] ABSTRACT

A device for managing cyclic pollings for the supervision of computer resources in a network, wherein in order to execute requests for requesting information requests from the various resources in the network using a single operation and a single clock, so that each request is emitted with the proper frequency, the device includes a data table (DT), which is indexed and which contains the data for each request to be emitted having its own index (idx) as well as its own theoretical emission period (pr), a cyclic poll table (PT) which contains the indexes (idx) of the requests with the emission dates thereof, which table (PT) is sorted in ascending order by the dates, with the first line containing the nearest date, and a wait table (WT), indexed by the indexes (idx) of the emitted requests waiting for responses, which contains the dates (d+pr) of the next emissions. The device further implements a process for managing cyclic pollings.

5 Claims, 1 Drawing Sheet

DEVICE FOR MANAGING CYCLIC POLLINGS FOR THE SUPERVISION OF COMPUTER RESOURCES IN A NETWORK AND A PROCESS IMPLEMENTED BY SUCH A DEVICE

BACKGROUND OF THE INVENTION

The present invention relates to a device for managing cyclic pollings for the supervision of computer resources in a network. It also relates to a process implemented by this device.

Generally, when it is desirable to supervise computer resources in a network, for example in order to establish or verify performances in this network, requests for information are emitted to these resources at regular intervals. Each request, known to one skilled in the art as a cyclic polling, or "poll", is emitted to a particular resource at regular intervals but with its own period, and is specific to a request for information characteristic of this particular resource, using distinct parameters for this purpose.

Up to now, two methods have been used to execute these requests with a properly determined period. According to the first method, an operation, called a "process" by one skilled in the art, is created and triggered to be executed at regular intervals delimited by a clock, called a "timer" by one skilled in the art, and each operation specific to one resource is executed independently from another operation specific to another resource. It cannot be ignored that the choice of such a method involves the use of a large number of operations or "processes", which is a major drawback, since it is well known that one of the problems encountered in computer systems is precisely their limitation in numbers of "processes." A second method, therefore, consists of using a single operation which equally and simultaneously controls all the periods suited to each request, and consequently includes a number of clocks which is equal to the number of requests for information and therefore equal to the number of resources to be supervised, keeping in mind that each time a clock runs out, it is automatically reset. In use, therefore, from a certain number of requests for information, quite a significant breakdown in the performance of a device which uses such a method is found, which in this field is a prohibitive drawback.

SUMMARY OF THE INVENTION

The object of the present invention is to eliminate the various drawbacks of the different known methods of the prior art, and to provide a device for managing cyclic pollings for the supervision of computer resources in a network, which device implements a process using a single operation, while making it possible to easily and efficiently maintain a high performance level.

To achieve this object, the device for managing cyclic pollings is advantageous in that, in order to execute requests for requesting information from the various resources in the network using a single operation and a single clock, so that each request is emitted with the proper frequency, the device includes a first table DT called a data table, which is indexed and which contains the data for each request to be emitted having its own index idx as well as its own theoretical emission period pr. The instant device also includes a second table PT called a cyclic poll table, which contains the indexes idx of the requests with the emission dates, which table PT is sorted in the ascending order of the dates, which means that the first line contains the nearest date. The instant device further includes a third table WT called a wait table, which is indexed by the indexes idx of the emitted requests waiting for responses and which contains the dates d+pr of the next emissions. The instant device implements a process for managing cyclic pollings which executes, in parallel, a first subprocess triggered as soon as a cyclic polling is placed in the table PT by a second subprocess, which first subprocess empties the table PT, fills the table WT and stops when the table PT is empty, while the second subprocess, triggered as soon as a response to the request in progress is received, fills the table PT, empties the table WT, and stops when there are no further requests waiting for a response.

Thus, according to the instant invention and contrary to all expectations, the instant device uses only one operation and limits the number of clocks to a single unit, in spite of highly unfavorable preconceptions by those skilled in the art about such a feature. In fact, it is generally believed by those skilled in the art that it is only possible to limit the number of clocks at the price of an extremely high increase in the complexity of the management process, which in principle renders this idea completely inapplicable.

DESCRIPTION OF THE PREFERRED EMBODIMENTS

Figure 1:
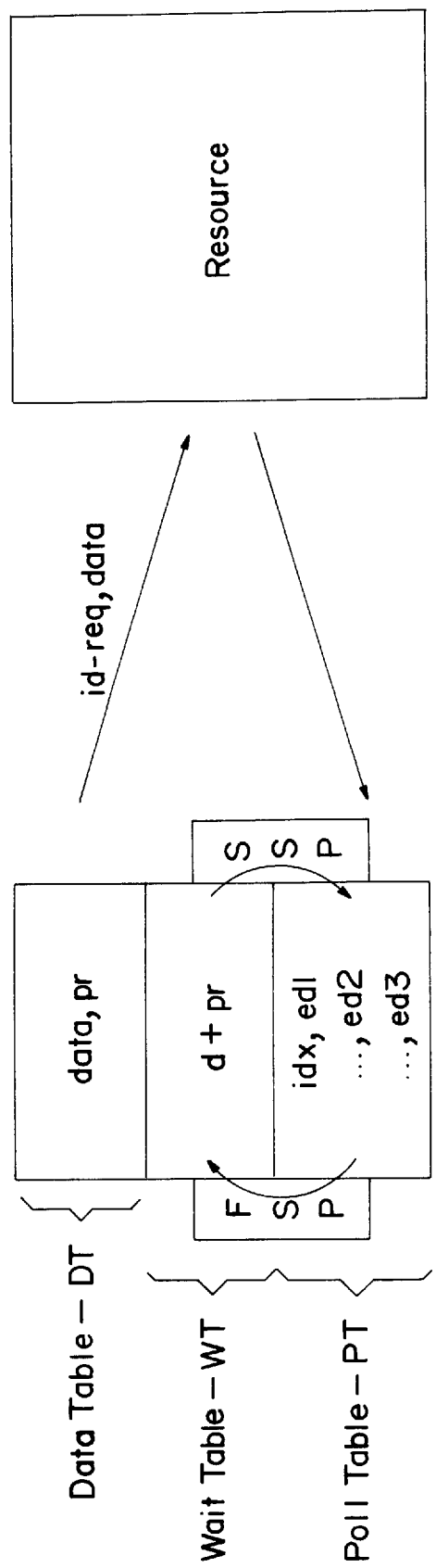
FIG. 1 a schematic view of a preferred embodiment of the device for managing cyclic pollings in accordance with the present invention.

With reference to FIG. 1, the process for managing cyclic pollings implemented by the device according to the instant invention is remarkable in that the first subprocess, once triggered, in a first step executes a reading of the date d and the index idx present in the first line of the table PT and erases this first line. In a second step, if the table PT is not empty, the subprocess initializes the clock, identifies the date d' and the index idx' in the new first line of the table PT, and applies a first wake-up function for executing, at the date d', this first subprocess for the index idx'. In a third step the subprocess reads, in the line of the table DT which has the index idx, the data related to the information requests specific to the request to be emitted on the one hand, and the period pr for calculating the date d+pr on the other hand. In a fourth step the subprocess authorizes the emission through the network of the request related to an identifier id-req suited to the request to be emitted. In a fifth step the subprocess adds, to the table WT, a line containing the index idx and the date d+pr, then in a sixth step the subprocess applies a second wake-up function for the execution of the second subprocess when the response to the request related to the identifier id-req is received, which identifier id-req is retained in the form of parameters. A second subprocess is then triggered in order to read, in a first step, the date of the next cyclic polling in the line of the table WT which has the index idx. In a second step the second subprocess erases the line of the table WT which has the index idx, to calculate from the date d+pr of the next cyclic polling the position at which to insert this date in order to keep the table PT sorted. In a fourth step the second subprocess inserts the date d+pr and the index idx at the calculated position in the table PT, then in a fifth step the second subprocess operates to either cancel the action of the first wake-up function applied by the first subprocess if it is still active and to restart the second step of the first subprocess if the calculated position corresponds to the first line of the table PT, or to terminate if the processing of the information received relative to the response to the emitted request has been carried out, which first subprocess is activated until the table PT is empty and which second subprocess stops when there are no more requests waiting.

Thus, knowing the duration of the period pr after which it is necessary to act, and knowing that the table PT is sorted, it is possible to know the date at which to send the request, for example in the form of a function of the GET type. For this purpose, the index corresponding to the request in question in the table DT, as well as the date at which to release this request to the network, is placed in the table PT. As soon as the request is emitted the line in question in the table PT is erased, the corresponding index is placed in the table WT, possibly with the useful information related to it and, after its calculation, the theoretical time d+pr at which this request must be re-emitted; however, the response to this request is awaited and no request requesting the same information specific to the resource is re-emitted as long as this response has not been received. Once the response to this request is received, the real date at which this request must be re-emitted is calculated and inserted at the correct position in the table PT, and since this table is always sorted, the first element which appears in the first line of the table PT is the first element to be emitted.

For a better understanding of the instant invention, the following description, which is understood not to be limiting, will make it clear how the invention may be implemented.

With the various computer languages used, and more particularly with the languages driven by data or events, currently called "event-driven" languages by one skilled in the art, a request is emitted through the network with an identifier suited to this request; it is therefore easy to distinguish the response to this request by continuing to monitor this response at this identifier. It must be noted that according to the present invention, the purpose of which to use only one operation and one clock, each request must be processed independently from another request, and a request is suited to an request for information specific to one computer resource in the network. This means that two identical requests destined for two different resources, even if the two resources are identical, are considered to be two specific requests, each with its own index and its own period, and are therefore processed independently. When the response from the network is received, a wake-up function activates a restart procedure called a "callback" procedure, which itself contains the operation related to the contents of the response, which procedure is therefore associated with the reception of the result of the request. Thus, for example, in the case of a performance supervision service, an action may be defined at the reception of a response, such as when the temperature of a supervised element exceeds a predetermined threshold and an alert is generated. In the same way, and simultaneously with the processing of the results contained in a response, upon the arrival of this response, the next emission of the request in question is calculated and the calculated date is placed in the proper position in the table PT. An essential feature is that a request cannot be emitted as long as the response to the previous request has not been received. However, in a remarkable way, it may be provided that if the response to a request has not been received after a predetermined time, this request is inhibited and the next request is emitted. It has been statistically noted that such a processing is exceptional and is equivalent to an error control, but in order to avoid a possible deadlock in the system, this processing is important and necessary.

In comparison, with the solution of the prior art, in which a plurality of clocks is used and each clock is associated with a request and therefore has an action to carry out, the requests are emitted at each period whether or not the responses have been received. Thus, when no response to a request has been received, this request is continually re-emitted through the network, needlessly overloading this network, and moreover the more it is re-emitted, the further the performances deteriorate.

However, the idea of using only one process and one clock is not without problems, and there were serious doubts as to the possibility of its application, considering the increase in complexity which this would entail relative to the management process. Each request to be emitted is, in this case, related through a particular context which must make it possible to unambiguously determine the request itself, the emission period and the actions to be carried out when the response to this request is received. It is the utilization of indexed tables containing the pertinent information which authorizes the reconstruction of the appropriate context, with each element of the context being read from the index in question. The useful information is constituted by two parts, a static part which includes the request, the resources for which the information is requested and the period, and a dynamic part which is modified at each request for information, in which the results of the last requests are stored, for each request and therefore for each index. According to the contents of this dynamic part, the actions to be carried out, for example in the supervision of performances (alert generation, notification of a change in value, etc.), are determined. The processing and switching of the requests executed from a single clock involves a slight time loss, since it is necessary to go and seek the useful information in the indexed tables. Thus, each time it is necessary to read and determine the index in the table DT in order to be able to reposition all the elements, execute the cyclic polling, and then modify the new information received by restarting. However, not only is this time loss more than compensated for, but moreover, performances are significantly improved relative to the device and the process of the prior art. In fact, the management of a plurality of clocks is very cumbersome, and the performance of an operation is affected considerably and has a tendency to deteriorate rapidly. On the other hand, the utilization of the device and the process according to the invention shows, through a simulation of the network, that there are very minimal deviations between the theoretical periods calculated and the actual periods obtained, due to the wait for the responses to the requests, which deviations are on the order of five per thousand. Moreover, another advantage is gained relative to the device and the process of the prior art, since when it is desirable at a given moment to change a period pr, the algorithm which describes the various steps of the process remains unchanged, it is sufficient to modify this period pr, and at the next reading the new period pr' will be used and the calculation of d+pr' will be carried out. On the other hand, with a clock which runs continuously, it is necessary to stop it in order to modify the period by modifying the algorithm, then to re-read all the information loaded and finally to restart the clock.

In fact, in order to significantly reduce the management complexity and overcome the preconceived ideas expressed in opposition to the concept behind the present invention, it was necessary to eliminate a certain number of the systematic steps generating the process to be implemented by means of the device claimed herein. Thus, the clock is set relative to the first line of the table PT, then when it runs out it is restarted for the following line so as to be continuously active while the first line is processed, which means that the request in question is emitted through the network and that simultaneously this first line is erased in the table PT and placed in a wait state in the table WT. The clock is therefore systematically reset until the last request. In the very specific case of a failure in the network such as a disconnected line, none of the emitted requests receives a response, the requests are inhibited as the emissions occur, the table PT is emptied little by little, and when this table is completely empty, the clock is no longer reset and the process stops. Returning to the general case, since effectively all of the necessary information is in the table DT, from the start the algorithm calculates the date of the next request in order to place it in the table WT, so that when the response arrives it is not necessary to re-read the table DT in order to be able to insert the calculated date at the appropriate position in the table PT, which thus remains properly sorted.

The following particular case, which is extremely simple, provides an instructive example which makes it possible to gain a clear understanding of the process implemented by the device according to the present invention. Suppose that a single, unique request is to be processed, and that the tables DT and PT therefore have only one line, with the table DT containing a single index idx, a single period pr and the data related to a single request, and with the table PT containing a single date d and the index idx. In conformity with the present process, the clock is set, and when it is about to run out, it is not reset since there is no next line. Therefore, once it runs out, the line in the table PT is erased and, after calculation, the date d+pr as well as the index idx are placed in the table WT, the request is emitted, and the response awaited. When the response received, the operation suited to the results is carried out, while the date d+pr and the index are placed in the table PT in the appropriate position, that is, the first line, since there is only one line, and therefore the clock is again reset.

Before showing an example of the algorithms which make it possible to describe the process used in the present invention, various functions or general functionalities which, with a few minimal differences, may be found in a great many computer languages, will be explained below:

a function hereinafter called "launchAfter" which wakes up the process after a determined time t and executes a function fct, which function fct and the time t elapsed, in the form of parameters, a function hereinafter called "removeTimer" which cancels the action of the function "launchAfter" executed previously. If the function "launchAfter" is not active at this instant, no action is carried out, a function hereinafter called "sendRequest", which emits a request through the network and supplies a request identifier id-req, a function hereinafter called "onReceive" which wakes up the process when the response to a request id-req is received and executes a function fct, which function fct is passed in parameters in context form, a function hereinafter called "findPositionPollTable" which takes as its parameters a date and supplies the position at which this date must be inserted in order to keep the table PT sorted, a function hereinafter called "getActualTime" which gives the actual date, a function hereinafter called "processResponse" which executes the processing of the information received during the response to the emitted request.

In addition, the following conventions and notations will be used:

PollTable[n] indicates the nth line (date d and index idx) of the table PT,

DataTable[idx] or WaitTable[idx] indicates the line of the table DT or of the table WT which has idx as its index, WaitTable[end] indicates the last line of the table WT, the allocation will be represented by the sign "←", in addition, when a line of a table is erased, it must be understood that the subsequent lines are shifted and the number of lines is decreased by one.

Once these definitions are set, the first subprocess according to the invention can be described, in this example, by the following algorithm 1:

functionPollOne( )
    start
        date_d, idx←PollTable[1]
        erase PollTable[1]
        setTimer( )
        period_pr, data←DataTable[idx]
        id-req←sendRequest (data)
        add to WaitTable the line containing the pair (idx, period_pr+date_d)
        onReceive (id-req, "insertinPollTable", idx) end Note: the function "insertinPollTable" is described with the second subprocess, therefore algorithm 2.

functionarmTimer( )
    start
        if PollTable is not empty
        then
            date_d, idx←PollTable[1]
            launchAfter (date_d-getActualTime, "PollOne")
        end if
    end When the response to the request is received, the following algorithm 2 is executed:

functioninsertinPollTable (idx)
    start
        dateNextPoll_d←WaitTable[idx]
        erase WaitTable[idx]
        position←findPositioninPollTable(dateNextPoll_d)
        insert (dateNextPoll_d, idx) in PollTable[position]
        if position=1
        then
            removeTimer( )
            setTimer( )
        end if
        processResponse( )
end Remarkably, the function "insertinPollTable" which represents the second subprocess, and therefore the algorithm 2, can be used to add new cyclic pollings to be processed in the device.

Thus, to summarize the implementation of the process according to the invention, the first subprocess and consequently the algorithm 1 is triggered as soon as a request or "poll" is placed in the table PT during the activation of the function "insertinPollTable" (second subprocess); it empties the table PT and fills the table WT and stops as soon as the table PT is empty. The second subprocess and therefore the algorithm 2 is triggered as soon as a response to a emitted request is received; it then fills the table PT, empties the table WT, and stops as soon as there are no further responses to waiting requests.

The two subprocesses, in fact, work on the same tables, on the same data, and in the same way as with two stacks, with one subprocess emptying a first "stack," the table PT, while the second subprocess fills it and vice versa with the second "stack", the table WT. The two subprocesses are implemented in parallel and act almost independently from one another, with the table DT being the only link between them, the first being triggered by the clock and the other by the reception of the responses to the requests.

To conclude, the instant device for managing cyclic pollings for the supervision of computer resources in the network, and the process implemented in conformity with the invention, make it possible, despite a highly unfavorable preconception about this idea, to advantageously and easily maintain a high level of performance using a single operation and a single clock, as just described.

While the several aspects and embodiments of the invention have been illustrated and described, it will be apparent to those of ordinary skill in the art that various changes and modifications may be made without deviating from the inventive concepts and spirit of the invention, and it is intended by the appended claims to define all such concepts which come within the full scope and true spirit of the invention.

I claim:

1. A device for managing cyclic pollings for the supervision of computer resources in a network, wherein, in order to execute requests for requesting information form the computer resources in the network, the device uses a single operation and a single clock, so that each request is emitted with a proper frequency, said device including a first data table (DT), said data table being indexed and containing data for each request to be emitted having an index (idx) and a theoretical emission period (pr), a second cyclic poll table (PT) containing indexes (idx) of the requests and emission dates, which cyclic poll table (PT) is sorted in ascending order by the emission dates, wherein a first line of said cyclic poll table (PT) contains a nearest emission date, and a third wait table (WT) indexed by the indexes (idx) of emitted requests waiting for responses and which contains the dates (d+pr) of a next emissions, said device further including means for implementing a process for managing cyclic pollings and executing, in parallel, a first subprocess triggered as soon as a cyclic polling is placed in the cyclic poll table (PT) by a second subprocess, which first subprocess FSP empties the cyclic poll table (PT), fills the wait table (WT) and stops when the cyclic poll table (PT) is empty, while the second subprocess SSP, triggered as soon as a response to the request in progress is received, fills the cyclic poll table (PT), empties the wait table (WT) and stops when there is no further request waiting for a response.

2. The device for managing cyclic pollings according to claim 1, wherein the first subprocess includes means for reading a date (d) and the index (idx) present in the first line of the cyclic poll table (PT) and erasing said first line, means for, if the cyclic poll table (PT) is not empty, initializing the clock, identifying a date (d') and an index ('idx') in a new first line of the cyclic poll table (PT) and applying a first wake-up function for executing, at the date (d'), said first subprocess for the index (idx'), means for reading, in a line of the data table (DT) which has the index (idx), data related to the information requests specific to the request to be emitted, and the period (pr) for calculating the date (d+pr), means for authorizing an emission through the network of the request related to an identifier (id-req) associated with the request to be emitted, means for adding, to the wait table (WT) a line containing the index (idx) and the date (d+pr), and means for applying a second wake-up function for an execution of the second subprocess when a response to the request related to the identifier (id-req) is received, which identifier (id-req) is retained in parameters, and further wherein the second subprocess triggered includes means for reading a date of the next cyclic polling in a line of the wait table (WT) which has the index (idx) and erasing the line of the wait table (WT) which has the index (idx), means for calculating from the date (d+pr) of the next cyclic polling a position at which to insert this date in order to keep the cyclic poling table (PT) sorted, means for inserting the date (d+pr) and the index (idx) at the calculated position in the cyclic polling table (PT), means for either cancelling the first wake-up function implemented by the first subprocess if the first wake-up function is still active and restarting in the first subprocess said means for initializing, identifying and applying if the calculated position corresponds to the first line of the cyclic polling table (PT), or to terminate if the processing of the information received relative to the response to the emitted request has been carried out, and further including means for enabling said fist subprocess to be activated until the cyclic polling table (PT) is empty and stopping said second subprocess when there are no more requests waiting.

3. The device for managing cyclic pollings according to claim 2, wherein said device includes means for inhibiting said request if the response to a request is not received after a predetermined time.

4. The device for managing cyclic pollings according to claim 3, wherein the second subprocess includes means for adding new cyclic pollings to be processed.

5. The device for managing cyclic pollings according to claim 2, wherein the second subprocess includes means for adding new cyclic pollings to be processed.

* * * * *

UNITED STATES PATENT AND TRADEMARK OFFICE
CERTIFICATE OF CORRECTION

PATENT NO. : 5,774,732

DATED : JUNE 30, 1998

INVENTOR(S) : Raphael DOUMARD

It is certified that error appears in the above-identified patent and that said Letters Patent is hereby corrected as shown below:

Col. 7, line 24 (Claim 7, line 3) "form" should be "from"

Col. 8, line 25 (Claim 2, line 27) "poling" should be "polling"

Col. 8, line 34 (Claim 2, line 37) "fist" should be "first"

Signed and Sealed this

Twenty-seventh Day of April, 1999

Attest:

Q. TODD DICKINSON

*Attesting Officer*  *Acting Commissioner of Patents and Trademarks*